Oct. 25, 1966  ISAMU MATSUI ETAL  3,281,088
AUTOMATIC KNOTTING DEVICE FOR BROKEN YARN IN AUTOMATIC WINDERS
Filed June 17, 1965                                                   15 Sheets-Sheet 6

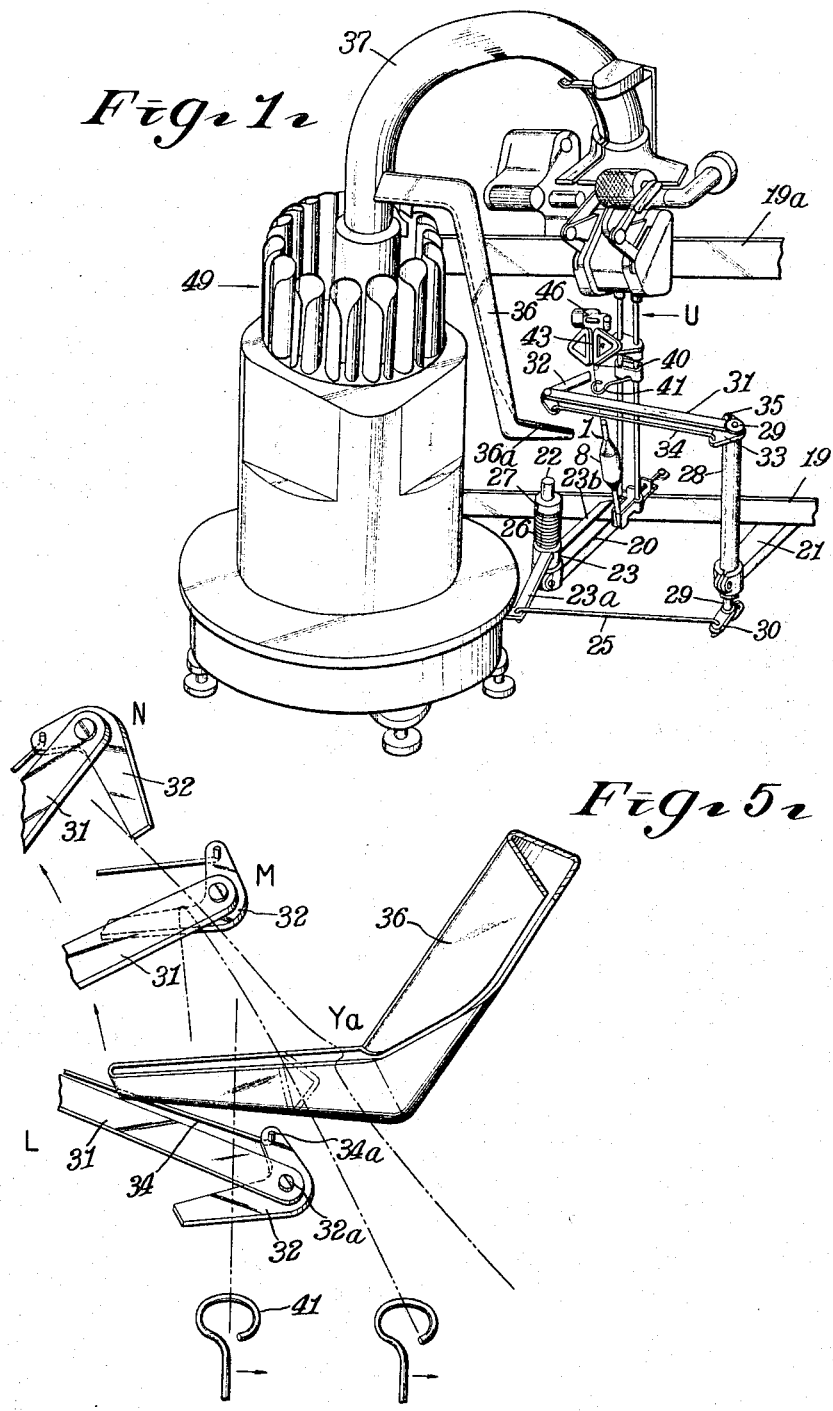

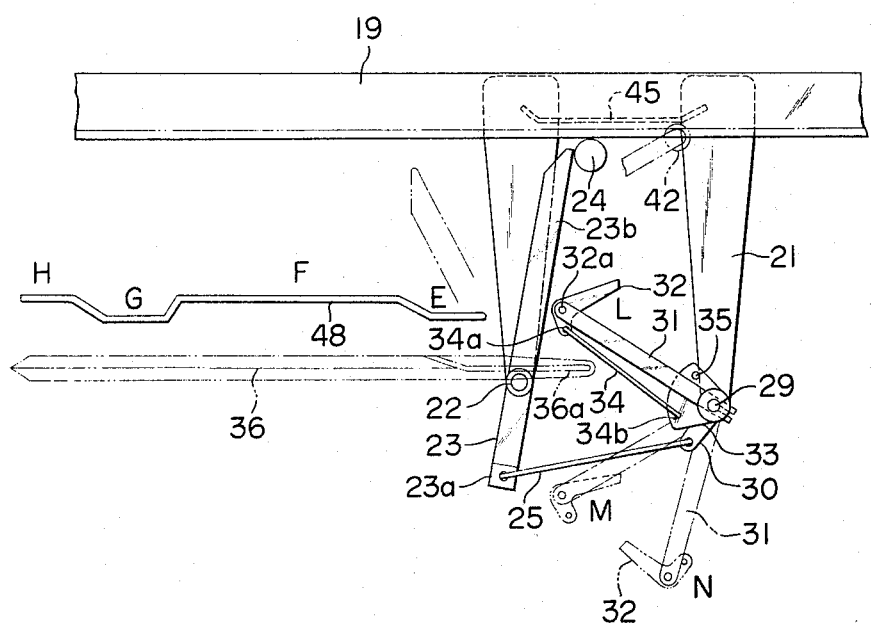

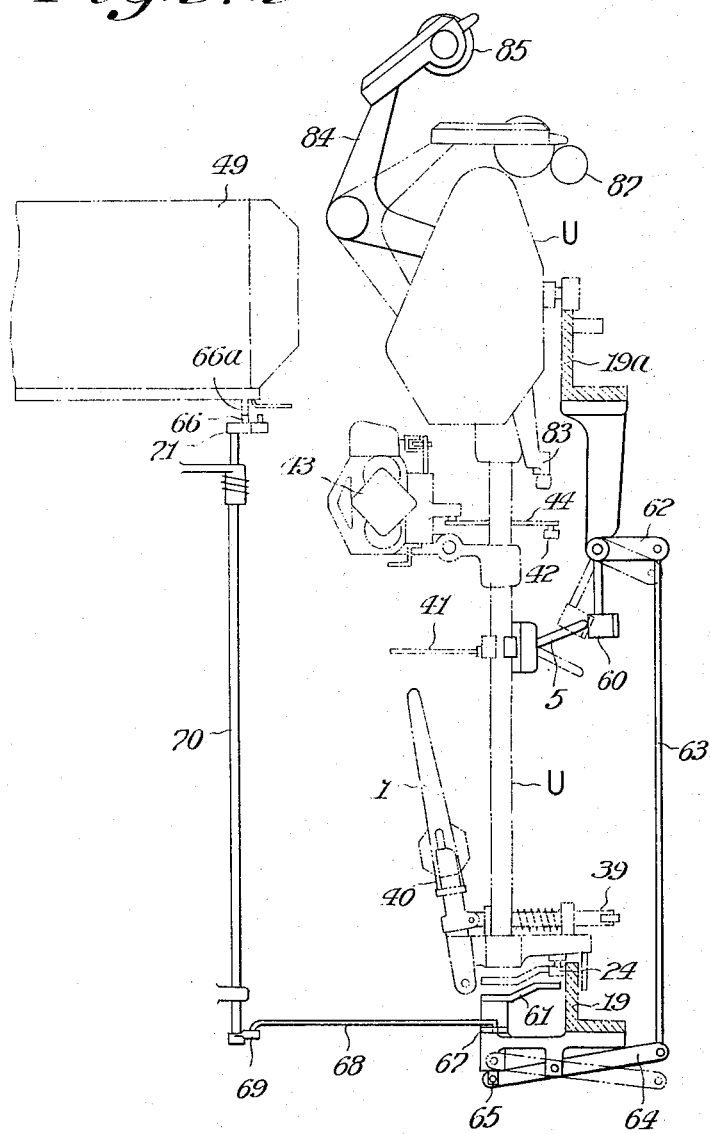

FIG. 8
FIG. 14
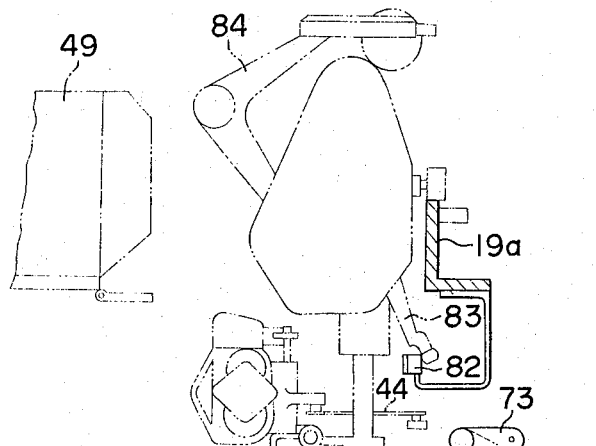
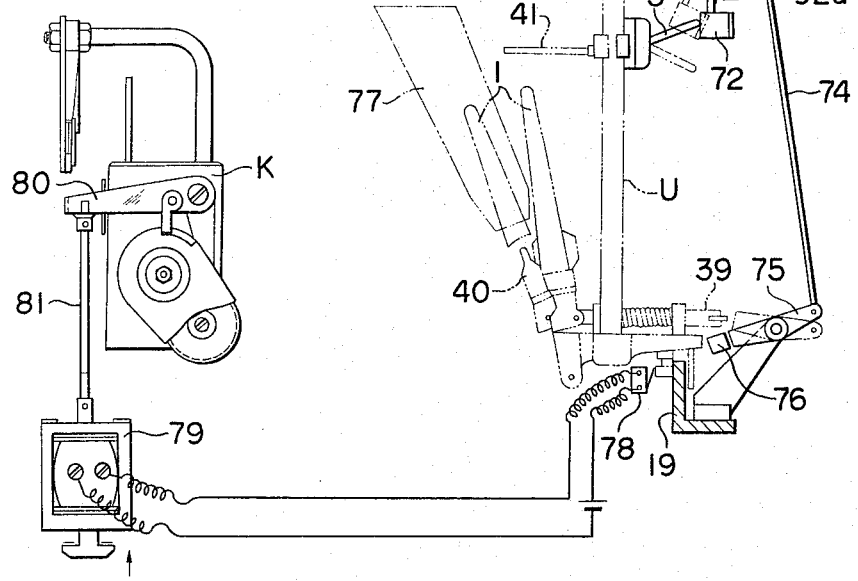
Isamu Matsui
Teiji Nakahara
INVENTORS.
BY Ross & Mostern

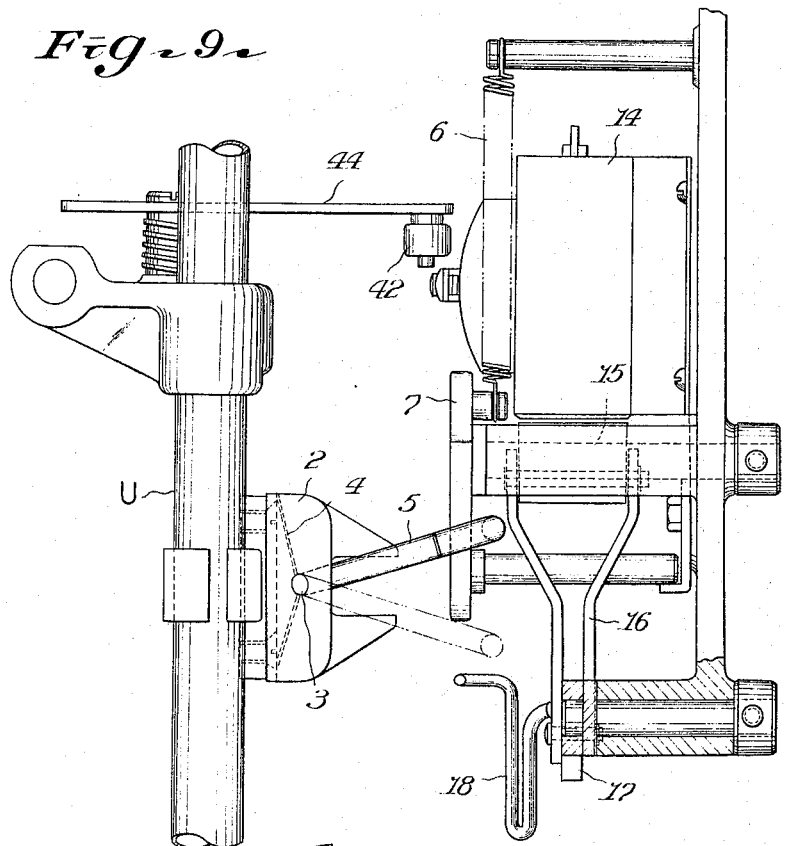
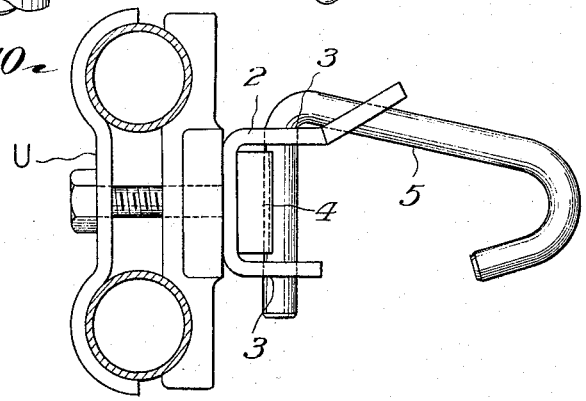

FIG. 11
FIG. 12
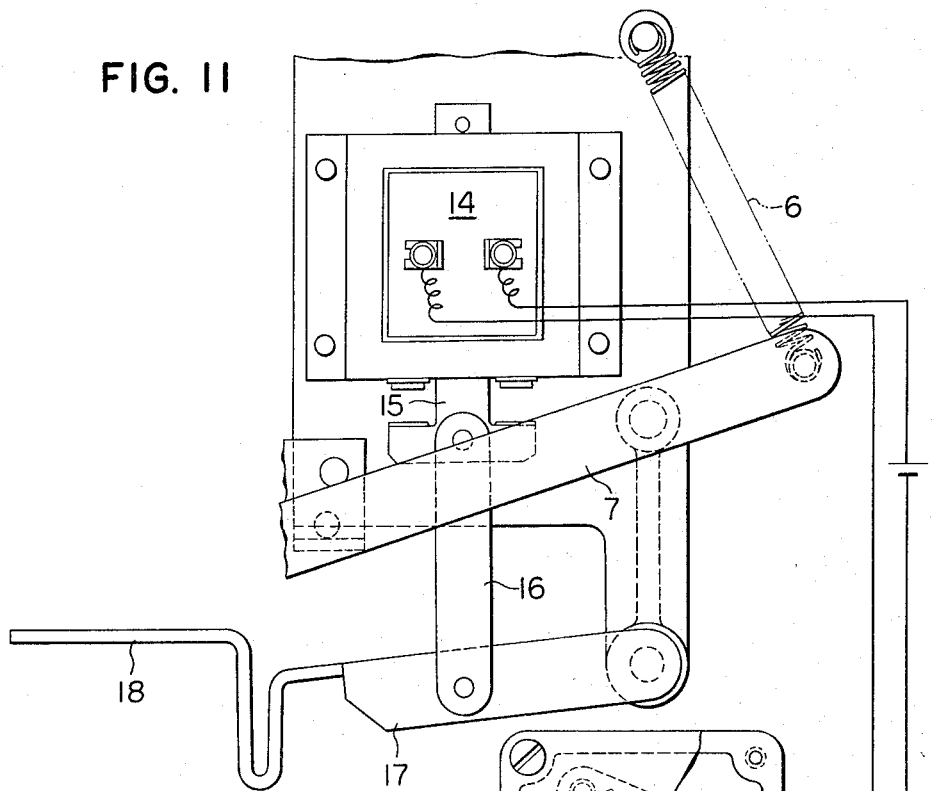
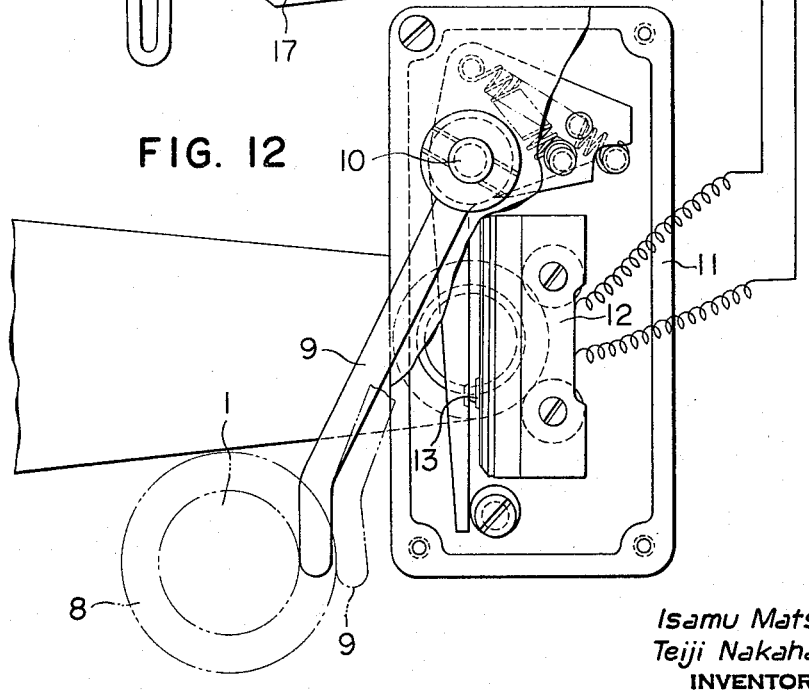
Isamu Matsui
Teiji Nakahara
INVENTORS.
BY Ross & Mestern

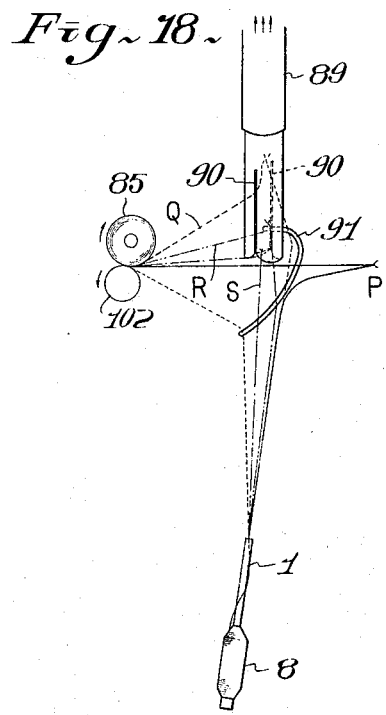
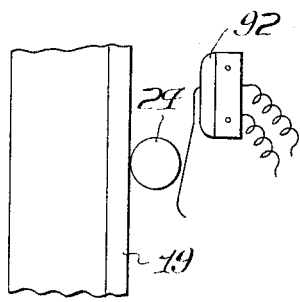
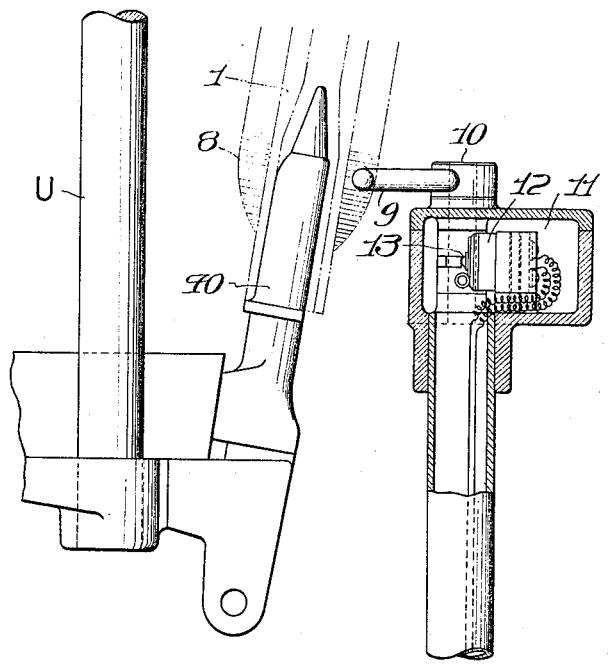
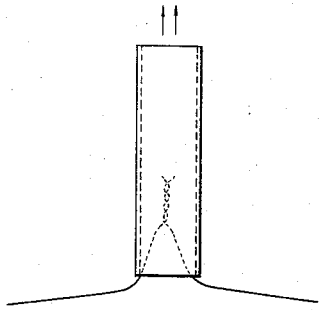

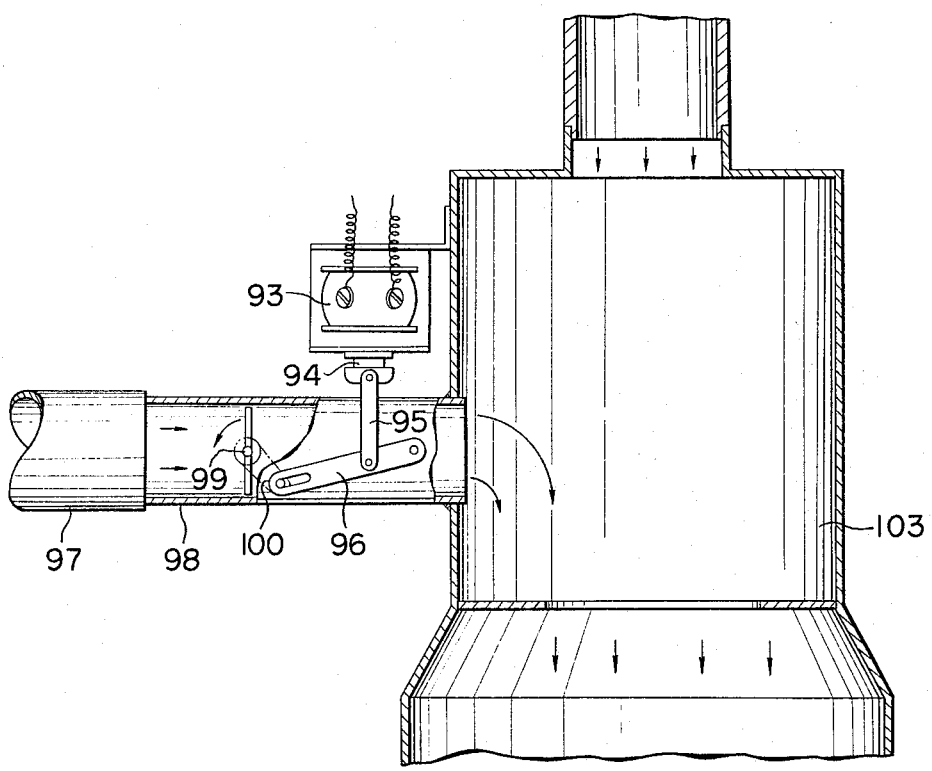

United States Patent Office 3,281,088
Patented Oct. 25, 1966

3,281,088
AUTOMATIC KNOTTING DEVICE FOR BROKEN YARN IN AUTOMATIC WINDERS
Isamu Matsui, Kyoto-shi, Kyoto-fu, and Teiji Nakahara, Toyonaka-shi, Osaka-fu, Japan, assignors to Murata Kikai Kabushiki Kaisha, Kyoto-fu, Japan, a joint-stock company of Japan and Toyo Boseki Kabushiki Kaisha, Osaka-fu, Japan, a joint-stock company of Japan
Filed June 17, 1965, Ser. No. 469,045
Claims priority, application Japan, Sept. 12, 1961, 36/46,738; Sept. 20, 1961, 36/34,127
4 Claims. (Cl. 242—35.6)

This application is a continuation-in-part of prior application Serial No. 222,795, filed on September 11, 1962, now abandoned, in the name of Isamu Matsui and Teiji Nakahara, and entitled "Automatic Knotting Device for Broken Yarn in Automatic Winders."

This invention relates to an automatic knotting device for broken yarns in an automatic winder of the Abbott type, that is, an automatic winder of the type wherein several winding units (hereinafter referred to merely as "units") travel in a circulatory path along a closed track as they accomplish yarn winding and, at a certain position along the track, each is replenished with a new bobbin.

An conventional Abbott-type automatic winder is so designed that at the above-mentioned certain position along the closed track, a bobbin is always doffed, and a new bobbin is fed. Consequently, if a yarn breaks at an intermediate position on the circular track, the bobbin with yarn remaining thereon will also be doffed. This bobbin will become mixed with completely empty bobbins and will cause difficulties in the subsequent process.

Heretofore, it has been necessary for a worker to splice such broken yarn by knotting by hand.

It is an object of this invention to eliminate the above necessity, thereby greatly increasing the efficiency of the winder and affording a saving in labor cost.

More specifically, it is an object of the invention to provide a new automatic knotting device for broken yarn, which automatically checks the bobbin of each unit arriving at a change position, and, if yarn remains on any bobbin, temporarily stops the feeding of a new bobbin, draws out the yarn end from the said bobbin of the unit, and knots the said yarn end to the yarn end of the package being wound, thereby enabling the winding operation to continue and causing only bobbins which are completely bare of yarn to be discharged.

It is another object of the invention to provide a device for preventing the development of kinks in the knotted yarn in the vicinity of the knotter.

While it is convenient to install the automatic knotting device of this invention as an integral part of the cop-supply magazine, it is also possible, of course, to install this device independently of the said magazine.

When a new bobbin is to be fed by means of a cop-supply magazine, the yarn ends on the package side and the bobbin side are knotted, then the bobbin is dropped toward the peg of the unit. At this time, the slack in the yarn created immediately after the fold-back condition of the yarn formed in the vicinity of the knotter is relatively little since the bobbin stretches the yarn while it is dropping. However, in the knotting device of this invention, which effects end finding directly on a bobbin with yarn breakage occurring at an intermediate point of the circulatory path of its unit and knots the broken yarn by means of a knotter, thereby enabling the unit to circulate further, such a dropping motion of the bobbin as mentioned above does not occur. Therefore, a means for preventing the development of kinks is necessary.

The nature and details of the invention will be more clearly apparent by reference to the following description of one embodiment of the invention when taken in conjunction with the accompanying drawings in which like parts are designated by like reference numerals and letters, and in which:

FIGS. 3A and 3–1 are plan views of the bobbin-carrier path showing the bobbin-supply magazine and the knotting means;

FIGS. 5A and 5–1 are side views diagrammatically showing the steps by which the yarn-end of a bobbin is drawn together with that of the yarn package to the knotting means;

FIG. 7 is a side elevational view of the section C of FIG. 2;

FIG. 8 is a side-elevational view of the section D of FIG. 2;

FIG. 9 is a side-elevational view of a portion of a unit, somewhat enlarged;

FIG. 10 is a plan view of a portion of the finger shown in FIG. 9;

FIG. 11 is a front-elevational view of a mechanism for actuating the finger of FIG. 10;

FIG. 12 is a plan view, with a part cut away, showing a mechanism for detecting residual yarn;

FIG. 13 is a side-elevational view corresponding to FIG. 12;

FIG. 14 is a side-elevational view of the driving mechanism of a knotter according to the invention;

FIG. 16 is a front-elevational view of one portion of the device of FIG. 15;

FIG. 17 is a plan-view of one portion of the device of FIG. 15;

FIG. 18 is a schematic diagram for facilitating a description of the operation of the device of FIG. 15; and FIG. 19 is a side-elevational view indicating the sucking action of a suction pipe which has no cut-out slits.

The automatic knotting device for broken yarn according to this invention will be described in detail in the case wherein it is installed integrally with a cop-supply magazine, reference being made to FIGS. 1 through 14, inclusive.

Figure 2:
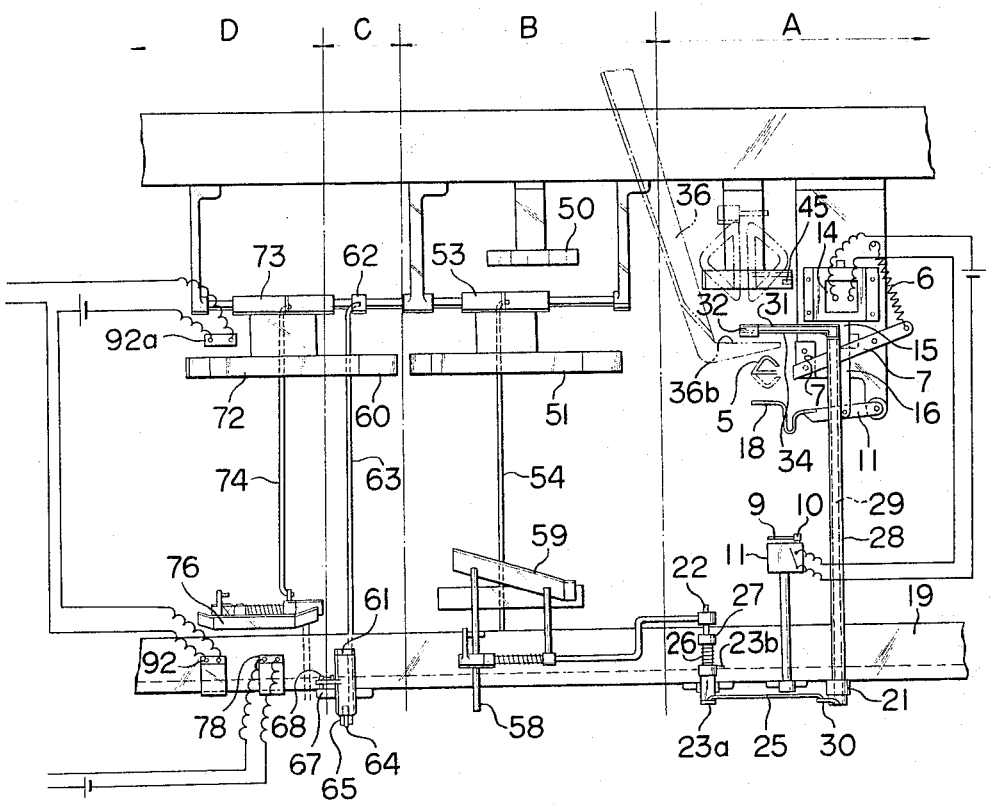
FIG. 2 is a front-elevational view showing a portion of the embodiment of FIG. 1.

The position of the section designated by A in FIG. 2 is upstream relative to the path of the units of a cop-supply magazine 49 (a knotting device in the case of installation independently of the said magazine). When a unit bearing a bobbin with residual yarn (a bobbin which has had yarn breakage during the winding operation) passes this section, a finger 5 which is mounted on the said unit is first lowered in accordance with the advance of the unit, by a finger-lowering cam 7 the upstream side of which is pulled upwardly by a spring 6, to a position indicated by chain or interrupted lines in FIGS. 2 and 9. Then, as the unit U continues to advance, the residual yarn 8 on its bobbin 1 contacts a feeler 9, as shown in FIG. 12. The feeler 9 is in the form of a lever for detecting residual yarn which rotates about a shaft 10 in the counter-clockwise direction (as viewed in FIG. 12). When this feeler 9, pressed against the residual yarn 8, is rotated as indicated by the chain line in FIG. 12, it pushes a button 13 of a sensitive switch 12 which is connected to the feeler 9 and is contained within a casing 11, whereupon an electrical circuit is closed and current is caused to flow through an electromagnet 14 (FIG. 11); the iron armature 15 of the electromagnet is drawn upwardly. The armature 15, acting through a lever hock 16 and a lever 17, lifts a lever 18, which thereby pushes up again the finger 5 which has been once pushed down by the finger-lowering cam 7, the finger 5 then being in the position indicated by solid line in FIG. 9. Thus, at this section A, the finger 5 of a unit U bearing a bobbin with residual yarn 8 is always directed upwardly; and when any other unit bearing a bare bobbin passes this section, its finger 5 is always turned downwardly in the position indicated by dot-dash lines in FIGS. 2 and 9.

Figure 3A:
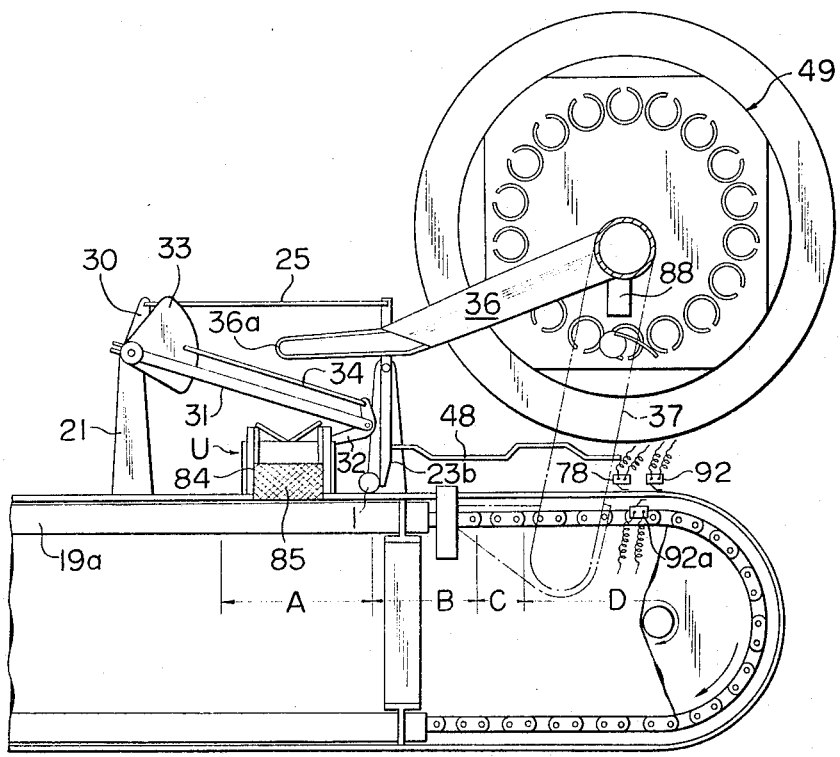
Figures 1, 3:
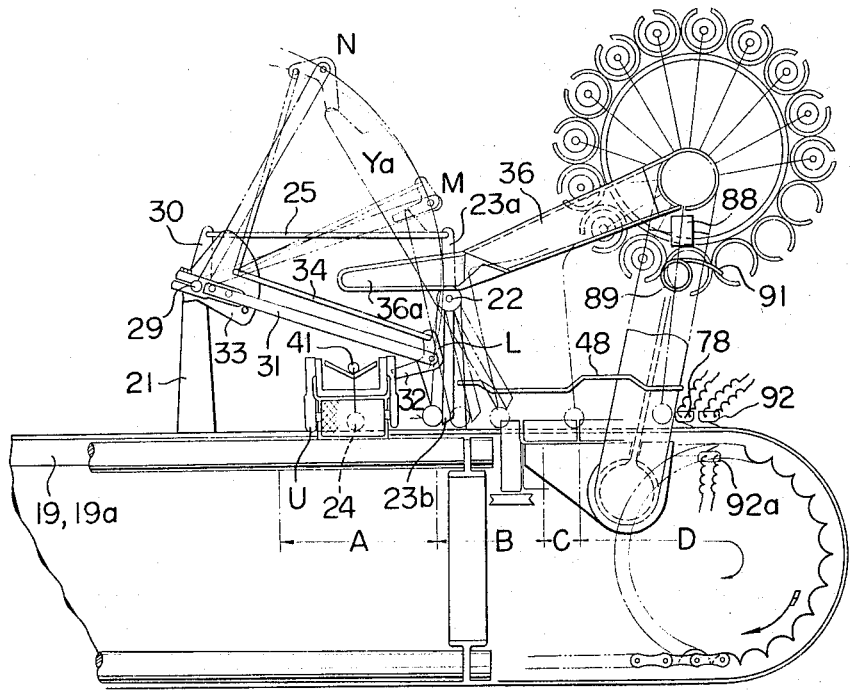
FIG. 1 is a perspective view showing one portion of the embodiment.
FIG. 3 is a plan view corresponding to the section A of FIG. 2.

Referring to FIG. 1, the units (only one unit, U, shown) are guided by annular rails 19 and 19a. Horizontal brackets 20 and 21 are fixed to the lower rail 19, and a support shaft 22 is fixed vertically to the outer end of the bracket 20. A bell-crank lever 23, which is loosely fitted on the support shaft 22, has a rear end part 23b, which is disposed in a position to engage with a guide roll 24 (FIG. 3) at the lowest part of each unit U, and a forward part 23a, at the end of which is pin-connected one end of a horizontal connecting rod 25, for actuating a yarn end pull-out arm 31 to be described hereinafter.

A coil spring 26 (FIG. 1) surrounding the support shaft 22 is provided for forcing the bell-crank lever 23 to return to its original position when it is rotated in the counterclockwise direction (as viewed in FIG. 1) by the unit U, and the unit U subsequently disengages from the bell-crank lever 23 as the unit U advances. This spring 26 is adjusted to the desired compressive force by a collar 27 adjustably fixed to the support shaft 22.

A cylindrical structure 28 is fixed vertically to the outer end of the bracket 21 and contains a vertical shaft 29 which is rotatably fitted therein. A horizontal lever 30 is fixed to the lower end of the vertical shaft 29 and is pin-connected at its outer end to the other end of the aforesaid connecting rod 25, supporting this rod 25 against vertical movement.

A yarn-end pull-out arm 31 (FIGS. 1 and 5) is fixed in a horizontal position to the upper end of the vertical shaft 29 and supports on its free end an L-shaped clamping member 32, which is connected at its bent portion to the arm 31 with a spring washer interposed therebetween. A fixed bracket 33 (FIG. 1) is formed integrally with the cylindrical structure 28 at the upper end thereof, and the outer end of this bracket 33 is connected to one end of the clamping member 32 by way of a connecting rod 34 so as to cause the clamping member 32 to rotate when the yarn end pull-out arm 31 rotates. An arresting pin 35 is fixed to the upper surface of the bracket 33.

A bent suction pipe 37 (FIG. 1) extends from the aforementioned cop-supply magazine 49 to a position behind the package-winding section. At an intermediate point of this suction pipe 37, a nozzle pipe 36 for sucking the yarn end is provided as a branch and has a horizontally formed tip 36a which has an opening directed upwardly. This tip 36a is positioned slightly below the plane of motion of the yarn-end pull-out arm 31.

Figure 4:
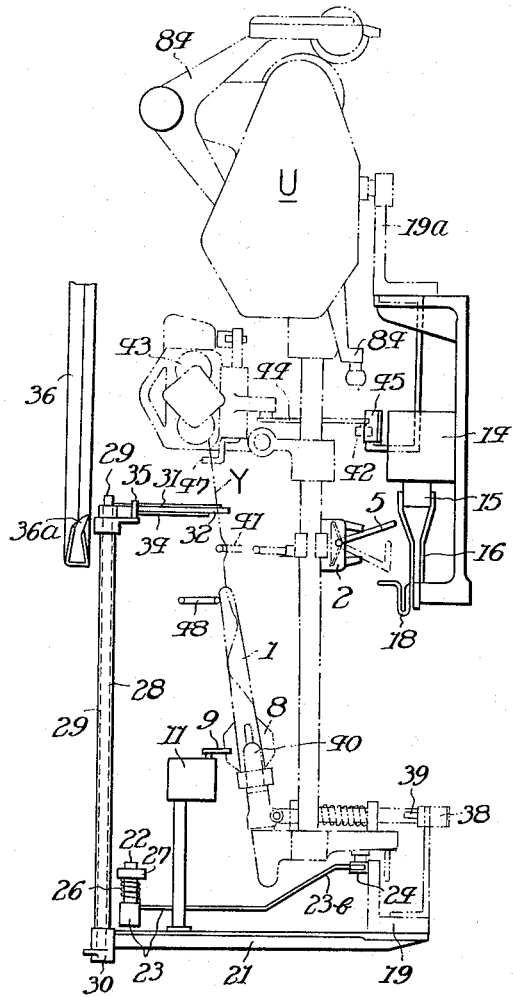
FIG. 4 is a side-elevational view of the portion corresponding to FIG. 3.

Referring particularly to FIG. 4, it may be seen that a cam plate 38 is fixed to the lower rail 19. This cam plate 38 is so adapted that when it acts on a roller 39 provided at the lower part of the unit U, a peg 40 supporting a bobbin 1 is caused to tilt slightly in the forward direction (toward the left as viewed in FIG. 4) so as to align the forward part of a balloon guide 41 and the centerline of the bobbin 1 and thereby facilitate the pulling out of the yarn end.

As illustrated particularly in FIGS. 3 and 4, a cam roller 42 is provided on the lower end part of a tension-disk actuating arm 44 of a tension device 43 installed on the unit U. When this cam roller 42 engages with a cam plate 45 fixed to the upper ring rail 19a, it causes the tension device 43 and a slub catcher 46 (FIG. 1) to open and release the yarn which has been held.

When a unit U in which yarn breakage has occurred during winding arrives at the section A indicated in FIG. 2, the finger 5, which has been in its raised position until up to this point, is pushed down by the finger lowering cam 7, and, successively, the feeler 9 fixed to the shaft 10 is subjected to pressing force by the residual yarn 8 and caused to retreat to a position such as that indicated by chain line in FIG. 12, thereby closing the switch 12 enclosed within the casing 11, whereby the circuit of the magnet 14 is closed. Consequently, the lever 18 is raised and pushes up again the finger 5 which has been once lowered. The cam plate 38 acts on the cam roller 39 and causes the peg 40, which is connected by way of a connecting rod to the cam roller 39, to tilt slightly forward, thereby directing the centerline of the bobbin 1 out of alignment with the center of the balloon guide 41 and facilitating the unwinding of the yarn.

On one hand, independently of the above-described operation, the guide roll 24 of the unit U engages with the rear end 23b of the bell-crank lever 23 and, in accordance with the advance of the unit U, causes the said lever 23 to rotate in the counterclockwise direction (FIG. 1), whereby this movement is transmitted through the connecting rod 25, lever 30, and vertical shaft 29 to impart a torque tending to rotate the yarn-end pull-out arm 31 in the same direction as the bell-crank lever 23. The said yarn-end pull-out arm 31 and clamping member 32, which are open in the form of the letter V and are disposed between a snail wire 47 of the unit U and the balloon guide 41, are disposed just above the lever 23b and upon engagement of the guide roller 24 of the unit U with the said lever 23b, the pull-out arm 31 and the clamping member 32 being to rotate in the counterclockwise sense; during this rotation the member 32 clamps the residual yarn between the snail wire 47 and the balloon guide 41. Accordingly, when the bobbin carrier U which sustained breakage of yarn during winding of the package approaches the section B shown in FIGS. 2 and 3, the guide roller 24 at the base of the carrier U engages the rear part 23b of the bell-crank lever 23 and rotates the latter in the counterclockwise direction; concurrently the lever 30 also rotates in the counterclockwise sense by virtue of the link 25 connecting levers 23 and 30 whereupon the yarn-end pull-out arm 31, which is secured on the upper part of the shaft 29 common to the lever 30 and constitutes part of the yarn-recovery means of the knotting means, is rotated counterclockwise together with the clamping member 32 at the extremity of this arm 31. When the yarn-end pull-out arm 31 is swung in the counterclockwise direction around the pivot shaft 29, the connecting rod 34 also is rotated with the hole 34b as the center. However, since the rotational center of the yarn-end pull-out arm 31 (i.e. the vertical shaft 29) and the rotational center 34b of the connecting rod 34 are offset, the locus of circular arc which the pivotal point 32a of the clamping member 32 describes and the locus of the circular arc described by the fixed point 34a of the connecting rod 34 on the clamping member 32 are different from one another, with the result that, while the yarn-end pull-out arm 31 moves from the position M to the position L as shown in FIGS. 3, 3A and 5, the clamping member 32 rotates in the clockwise direction and gradually pulls out the residual yarn 8 from the bobbin 1 with the yarn end Y being tightly clamped between the yarn-end pull-out arm 31 and the clamping member 32, said yarn end Y having been introduced into the clamping member 32 between the snail wire 47 of the carrier U that sustained breakage of yarn and the ballon guide 41; when the carrier U sustaining yarn breakage continues its movement rightwardly, the yarn-end pull-out arm 31 rotates from the position M to the position N and simultaneously the clamping member 32 changes its rotational direction from clockwise to counterclockwise and releases the yarn end which had formerly been clamped (see the reference symbol N in FIGS. 3A and 5); concurrently, the released yarn-end Ya is drawn into the nozzle mouth 36a of the suction nozzle 36.

Figure 5A:
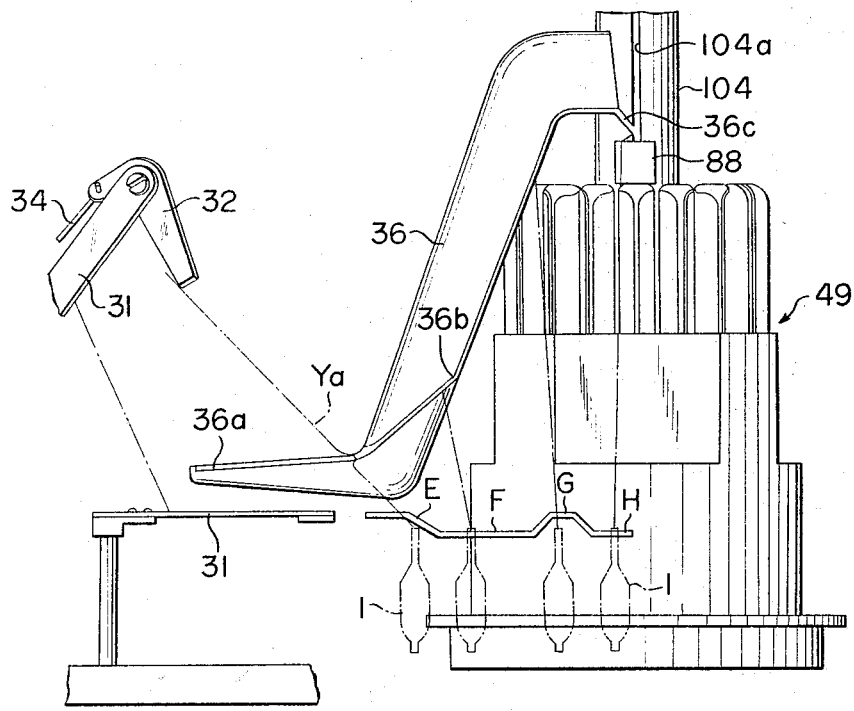
Figures 1, 5:
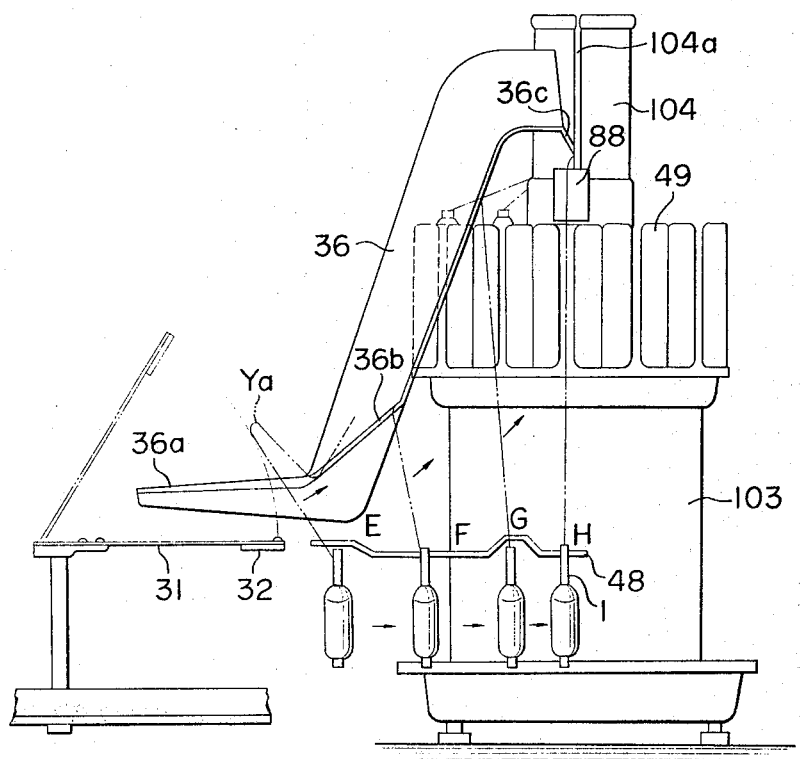
FIG. 5 is a perspective view, in diagrammatic form, as viewed from the rear closed-track side, showing the action of a yarn-end pull-out arm.

As is shown in FIG. 5, the suction nozzle 36 is connected with the main suction nozzle 104 which is situated nearly at the center of the cop-supply magazine 49. The position of the suction mouth 36a is represented at L, a part of the semi-circular arc LN which represents the rotation range of the yarn-end pull-out arm 31 and the clamping member 32; the mouth 36a is also situated slightly above the clamping member 32 in the vertical direction, and further is connected to the suction duct 36b which is provided in the suction nozzle 36. The suction duct 36b joins with the suction duct 104a of the main-suction nozzle 104 by way of the suction duct 36c. Close by the front side of the main suction nozzle 104, the knotting device 88 is provided.

When the unit U moves toward the right as shown in FIG. 5A and passes from the section B to the sections C and D as shown in FIGS. 2 and 3A, the yarn end Ya which has been released from the yarn-end pull-out arm 31 and the clamping member 32 gradually is drawn upwardly along the suction duct 36b of the suction nozzle 36, and when the cop 8 whose yarn is broken comes to a position in front of the knotter 88, the yarn end Ya transfers from the ducts 36b to 36c and then reaches the duct 104a of the main suction nozzle 104 and then is taken up by the knotter 88.

As shown in FIGS. 3 and 4, at the time when the yarn end Ya is drawn out by arm 31, the cam plate 45 on the ring rail 19a acts on the cam roller 42 thereby opening the tension device 43 and the slub catcher 46 to release the yarn end Ya which had been clamped therein.

Referring now to FIGS. 3, 4 and 5A, it may be observed that a wire 48 is disposed approximately midway between the annular rails 19 and 19a, in alignment with the top parts of the bobbins at an orientation parallel thereto. As indicated in FIG. 3, the wire 48 is bent at several locations and comprises concave sections E and G and convex sections F and H. The section E is disposed along the path of the yarn end pulled out of the bobbin 1 and is at a position slightly spaced from the bobbin head. The section F is disposed in a position which is synchronized with the completion of the operation of pulling out the yarn and contacts the bobbin head so as to prevent the pulling-out of an unnecessary length of yarn. The section G is positioned in front of the knotter 88 (see FIG. 5A) which is situated nearly at the center of the cop-supply magazine and is so adapted as to lessen the contact pressure on the head of the bobbin of the unit U which has moved to the said section G, thereby affording the yarn end to be transferred to the knotter 88 by way of from the suction ducts 36b and 36c of the suction nozzle 36 to the suction duct 104a of the main suction pipe 104. The section H is adapted to contact the bobbin head again immediately after completion of the transfer of the yarn to the knotter and to prevent the yarn from being drawn into the main suction pipe 104 during knotting.

Figure 6:
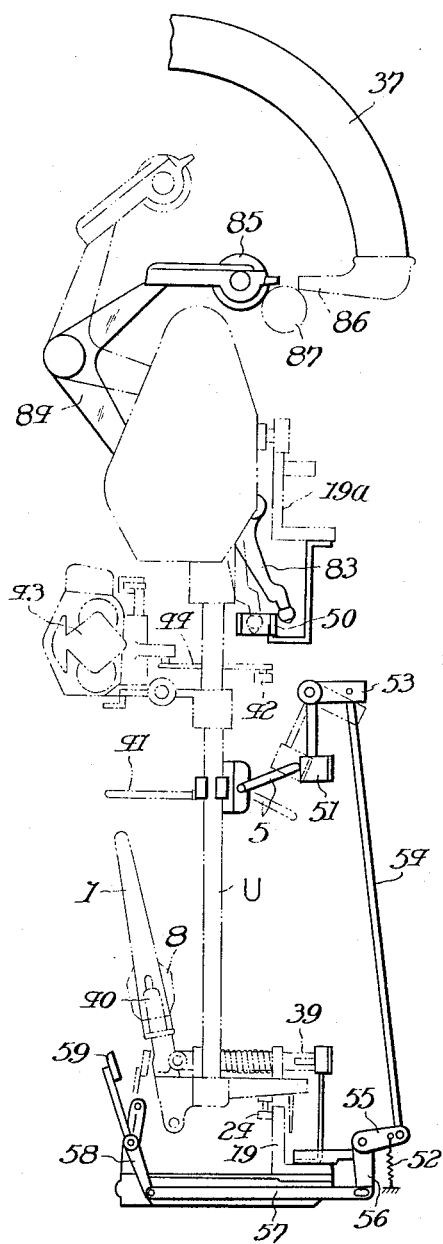
FIG. 6 is a side-elevational view of the section B of FIG. 2.

Referring now particularly to FIGS. 2 and 6, it may be seen that cam plate 50 is supported on the upper rail 19a at one point in section B of FIG. 2. At a position below this cam plate 50, there is provided another cam plate 51, which is normally in the position indicated by chain line (FIG. 6) because of the pull of a spring 52. When a unit U bearing a bobbin with residual thread passes this section, its finger 5 pushes the cam plate 51 to the position indicated by solid line. This movement is transmitted through a lever 53, a link 54, levers 55, 56, a link 57, and a lever 58 to a bobbin plow 59, which is thereby retracted from the chain-line position to the solid-line position, at which the plow 59 does not doff the bobbin 1.

As seen in FIGS. 2 and 7, a cam plate 60 is fixed to one arm of a crank lever 62 pivoted on a bracket fixed to the upper ring rail 19a at a point in section C of FIG. 2. When a unit U bearing a bobbin with residual yarn passes this section C of this cam plate 60, the finger 5 pushes the cam plate 60 from the chain-line position to the solid-line position, and a lever 61 is thereby caused by a linkage consisting of the lever 62, a link 63, a lever 64, and a shaft 65 to sink downwardly. Accordingly, as the unit U advances, the lever 61 is not acted upon by the guide roll 24 of the unit U but is in a state of rest, wherefore the cop-supply magazine 49 is stopped, and the supplying of a new bobbin is not accomplished.

That is, the cop-supply magazine 49 is mounted on a friction disk (not shown) and is constantly acted upon by a force tending to rotate it in the counterclockwise direction, but since a clutch pin 66 is engaged with one of the stop pins 66a attached to the lower part of the cop-supply magazine 49, the said magazine 49 is stopped when the clutch pin 66 is in the solid-line position of FIG. 7, and when the clutch pin 66 is in the chain-line position, its engagement with the stop pin 66a is broken, and the said magazine 49 begins to move. The operation of the friction disk, the stop pins for each pocket, and the means for dropping the cops or bobbins can be of the type described in U.S. Patent No. 2,177,763 (especially FIGS. 4 and 5).

The movement of the clutch pin 66, that is, its position relative to the stop pin 66a, is controlled by the aforementioned guide roll 24 of the unit U and lever 61. Thus, when the guide roll 24 engages the lever 61, resulting movement is transmitted through a lever 67, a link 68, a lever 69, and a vertical shaft 70 to cause a lever 71 to rotate, whereby the clutch pin 66 which is implanted in this lever 71 is shifted to the chain-line position. The cop-supply magazine 49 rotates only when the clutch pin 66 is in this chain-line position to accomplish the supplying of a new bobbin. When the lever 61 is in its lowered position, i.e., when there is residual yarn on the bobbin 1, and the finger 5 is in the full-line position, the supplying of a new bobbin does not take place. Delivery of the cop is effected, upon rotation of the magazine, when the new cop falls through an opening as described in said patent.

Referring particularly to FIGS. 2 and 8, it will be noted that a cam plate 72 fixed to one end of a crank lever 73 is provided at one point in section D of FIG. 2. When a unit U bearing a bobbin with residual yarn passes this section D, its finger 5 pushes the cam plate 72 from the chain-line position to the full-line position as shown in FIG. 8. This movement is transmitted through the lever 73, a link 74, and a lever 75 to a cam plate 76, whereby the cam plate 76 is shifted from the chain-line position, which is in the path of the aforementioned roller 39, to the full-line position, which is clear of the said path. Accordingly, the roller 39, which is coupled by way of a connecting rod to the peg 40, passes by the cam plate 76 without being influenced thereby. As a result, the peg 40 is not tilted and passes without contacting a chute 77 of the supply means for mounting new bobbins upon each bobbin carrier U.

That is, when some yarn exists about the bobbin 1 carried by the unit U, the unit U merely passes by the various devices described above, and neither bobbin doffing nor supplying of a new bobbin takes place.

However, when a unit U bearing a bobbin with broken yarn passes section D of FIG. 2, a sensitive switch 78 which is installed on the lower ring rail 19 is actuated, whereby its circuit is closed, current flows through an electromagnet 79 shown in FIG. 14, and the usual lever 80 of the knotter is pushed upwardly by way of a rod 81. This movement causes the knotter to operate, whereby the yarn end on the bobbin side which has previously been led to the knotter and the yarn end on the package side which has been pulled out by a known mechanism are knotted.

Referring particularly to FIGS. 6, 7, and 8, when a unit U which has passed by all of the various devices in the above-described manner passes the bend in the ring rails and enters the straight-line part on the far side, a cam plate 82 fixed to the upper ring rail 19a contacts a lever 83 on the unit U, causing a cradle 84 which supports a package 85 to descend and the winding operation to begin.

In the foregoing disclosure, the essential construction of the knotting device of the invention and the operational steps taking place while a unit in which yarn breakage has occurred passes by the said knotting device have been described. To facilitate a clearer understanding of the nature of the invention, a summary of the operation is presented below.

(1) At the section A of FIG. 2, the finger 5 is pushed up by a force transmitted by way of such parts as the feeler 9 (lever for detecting residual yarn) and the lever 18, and all of the cam plates 51, 60, and 72 are placed in their states of preparedness for being actuated. On one hand, the yarn end pull-out arm 31 operates to pull out the residual yarn, and the yarn end Ya on the bobbin side in drawn by the suction nozzle 36 and transferred to the knotter.

(2) At the section B, the finger 5 acts on the cam plate 51 and causes the bobbin plow 59 to the displaced from its operative position, whereby the bobbin on the unit passing by this section is left unremoved. On one hand, the cam plate 50 causes the cradle 84 to tilt, whereby the yarn end of the package 85 is drawn by a nozzle 86 and is transferred by way of the suction pipe 37 to the knotter.

(3) At the section C, the cam plate 60 is actuated by the finger 5 and retracts, thereby acting through the link 63, lever 64, and other parts to displace the lever 61 to a position clear of engagement with the guide roll 24 and to cause, through the clutch pin 66, the cop supply magazine 49 to remain at rest without rotating.

(4) At the section D, the microswitch 78 is closed to cause the knotter to operate and knot the yarn end on the bobbin side and the yarn end on the package side. Since, at this time, the cam plate 76 is in its position which is clear of engagement with the roller 39, the peg 40 is not tilted forwardly but passes by the front of the chute 77.

When the yarn on a bobbin carried by a unit has been completely taken up while the unit makes one circuit (two or more circuits in the case of yarn breakage) along the ring rails, and no yarn is left on the bobbin, the feeler 9 does not contact the bobbin (as shown by full line in FIG. 12) when the unit arrives at the section A indicated in FIG. 2. Accordingly, the switch 12 within the casing 11 remains open, and the magnet 14 is not magnetized, whereby the lever 18 does not raise the finger 5. Consequently, when the unit successively passes by the sections B, C, and D, its finger 5 does not actuate any of the cam plates 51, 60, and 72.

When the unit bearing a bare bobbin passes by the section B, the lever 53 remains at rest in the chain-line position since the cam plate 51 is not actuated. Accordingly, the bobbin plow 59 remains in its advanced, operative position, whereby when the unit U arrives at this point, the lower end of the bobbin 1 rides onto the bobbin plow 59 and is removed from the peg 40. On one hand, the cam plate actuates the starting lever 83, which is thereby caused to pass by this point in an inclined state as indicated by its full-line contour shown in FIG. 6. Consequently, the cradle 84 is caused to tilt to the full-line position and contact a reverse rotation roll 87, and the yarn end is sucked by the nozzle 86 and transferred by way of the suction pipe 37 to the knotter.

When the above unit passes by the section C, since the lever 61 is in its raised position of engagement with the guide roll 24 as is indicated by chain line, the lever is caused to rotate by the advance of the unit, and this movement is transmitted by the lever 67, link 68, lever 69, and shaft 70 to shift the lever 71 to its chain-line position, whereby the clutch pin 66 is disengaged from the stop pin 66a, permitting the cop supply magazine 49 to rotate. Successively, the yarn end of the bobbin and the yarn end of the package are knotted by the knotting device. Then, a new bobbin within the cop supply magazine 49 is discharged toward the chute 77.

When the same unit U passes by the section D, since its finger 5 is still in its lowered position as stated hereinbefore, it does not contact the cam plate 72, and the cam plate 76, which is coupled to the cam plate 72 through the lever 73, link 74, and other parts, remains also in the chain-line position. Consequently, the roller 39 is caused by the advance of the unit U to contact the cam plate 76, whereby the peg 40 is caused to tilt forwardly, and the new bobbin dropped through the chute 77 is fitted onto the peg 40. Subsequently, the starting lever 83 contacts the cam plate 82, and the package is pressed against a winding roller or a winding drum and placed in a state of preparedness for the start of the winding operation.

The above description has been that of the operational steps accomplished as a unit bearing a bare bobbin from which the yarn has been completely taken up passes by the automatic knotting device of the invention. In order to indicate still more fully the nature of the invention, a summary of these operational steps is presented below.

(1) At the section A, although the finger 5 remains in its lowered position, the yarn end pull-out mechanism is set in motion. However, since there is no residual yarn on the bobbin, the yarn-end pull-out mechanism merely undergoes idle motion without effecting yarn end pull-out.

(2) At the section B, since the came plate 51 is not actuated by the finger 5, the bobbin plow is in its operative position and extracts the bobbin from the peg 40. On one hand, the cam plate 50 causes the cradle 84 to tilt, and the yarn end of the package 85 is sucked by the nozzle 86 and is transferred by way of the suction pipe 37 to the knotter.

(3) At the section C, since the came plate 60 is not actuated by the finger 5, the clutch pin 66 is in its position of disengagement from the stop pin 66a, as shown by chain line in FIG. 7, and the cop supply magazine 49 is permitted to rotate.

(4) At the position D, the microswitch 78 is closed, and the knotter operates. On one hand, the peg 40 is tilted forwardly to the necessary angle and receives a bobbin the knotting of which has been completed.

As described in detail above, the device of this invention is so adapted that: the condition of a unit in which yarn breakage has occurred during winding is detected by means of a feeler 9; the yarn end of the bobbin with residual yarn is knotted to the yarn end on the package side without the said bobbin being extracted; and in the case of a bare bobbin, it is extracted, and a new wound bobbin is supplied. Accordingly, by the operation of the device of this invention, the winding efficiency is greatly increased, and such labor as knotting operators is made unnecessary, whereby a saving in labor cost also is realized.

Figure 15:
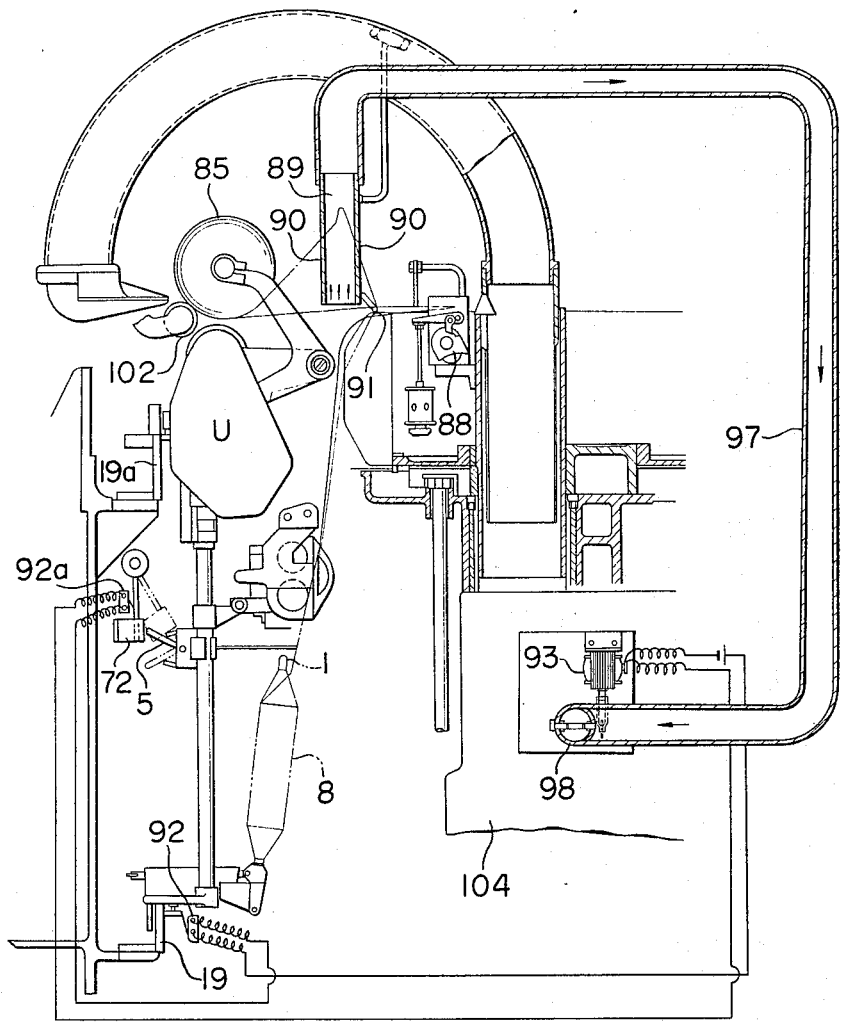
FIG. 15 is a side-elevational view of a device for preventing kinks in the embodiment of this invention.

In FIGS. 15 and 18, there is shown a suction pipe 89 which is open at the bottom and is provided between and somewhat above the knotter 88 and the winding unit U which also constitutes the bobbin carrier. In the walls of this pipe 89 facing the knotter side and the winding side, two slits 90 are provided adjacent the pipe opening in a direction parallel to the axis of the pipe 89. Further-more, a separator 91 bent in the form of a helix is provided in the vicinity of the lower end of the suction pipe 89 and extending therebelow. As shown in FIGS. 15 and 16, the suction pipe 89 is connected with a chamber of suction blower 103 by the pipe 98 which passes therethrough and the flexible pipe 97. As indicated in FIGS. 3A, 15, 16 and 17, a sensitive switch 92 is provided near the lower annular rail 19 somewhat closer toward the direction of travel of the bobbin of the winding unit in front of the knotter and is so adapted that when the carrier U passes thereby, its guide roll 24 pushes the said switch 92, thereby closing the circuit. Also, as shown in FIG. 15, a sensitive switch 92a, which closes the circuit when the aforementioned cam plate 72 is pushed by a raised finger of carrier U that sustained yarn breakage, is provided on the upper annular rail 92a and the switches 92 and 92a are connected in series. In the circuit of these switches 92, 92a there is connected an electromagnet 93 with a moving member or armature 94. The moving member 94 is secured to a lever 96 through the link 95, the end part of the said lever 96 is articulated to a crank arm 100 which is fixed to a damper shaft 99 passing through the pipe 98 connected with the suction pipe 89 and the flexible pipe 97; to the shaft 99 is secured a damper 101.

FIGS. 15 and 18 show, in diagrammatic form, the essential parts of the kink-preventing device of the invention, that is, a cheese or take-up reel 85, a regular-rotation roll 102 which rotates in contact with the cheese 85, and the bobbin yarn 8 on a bobbin 1. As mentioned in the foregoing, when the unit that has sustained yarn breakage moves toward the cop-supply magazine, the yarn end at the bobbin side is guided to the knotter 88 through the suction nozzle 36 after being pulled out by the arm 31 and, at the same time, the yarn end of the cheese 85 reaches the main suction pipe 104 through the suction nozzle 86 and the suction pipe 37 and then it is brought to the knotter 88 together with the yarn end from the bobbin side. As the carrier that sustained yarn breakage continues its movement toward the cop-supply magazine, a sensitive switch 78 installed at the lower rail 19 is tripped by the guide roll 24 at the lower end part of the unit, whereby the knotter 88 is actuated and the yarn ends at the bobbin side and the cheese side which are arranged on the knotter 88, are knotted together.

Immediately after tying is accomplished in the knotter 88, the guide roll 24 at the lower end part of the unit that caused yarn breakage engages, in its continuous movement, with the switch 92 installed on the lower rail 19 forwardly of the switch 78, thus closing the electrical circuit. On the other hand, since the raised finger 5 has been kept in pressing contact with the cam plate 72 before the guide roll 24, at the lower end part of the unit engages the switches 78 and 92, the circuit of the switch 92a remains closed with the result that, as soon as the guide roll 24 trips the switch 92, electric current begins to flow in the circuit; the electromagnet 93 is thereby energized and the moving member 94 is actuated, whereupon the link 95 raises the free end of the lever 96 and, through the arm 100, rotates the shaft 99 and the damper 101 in the direction of the arrow shown in FIG. 16. Thus, air which has been stationary begins to flow in the direction of the arrow (rightward) as is drawn by a suction blower. At this time, the air which has been stationary in the suction pipe 89 also begins to flow in the direction of the arrow.

Accordingly, after tying of the broken yarn ends, the yarn which has been released from the knotter is drawn into the suction pipe 89 by the flow of air and is caused to rise along the slits 90, so as to prevent an entwining of the yarn of the type shown in FIG. 19. At this time, the regular-rotation roll 102 rotates to cause the yarn to be wound up on the cheese 85 (the regular-rotation roll is so designed as to make one revolution by release of a clutch when the winding unit comes to a particular position) and the slack yarn is pulled taut when it is caused to slide along the separator 91 and successively to assume the positions indicated by P, Q, R and S in this order in FIG. 18. The separator 91 is provided for the purpose of preventing entanglement of the yarn during winding and to impart tension to the yarn and has proved to be effective, when operated co-operatively with the suction pipe 89, in completely removing slack. When the carrier that sustained yarn breakage continues its movement, the engagement of the switch and the guide roll terminates with the consequence that the damper is closed and the regular-rotation roll is stopped. When the unit in its continued movement passes the area D as shown in FIG. 3A, it again commences the winding operation.

Although this invention has been described with respect to a particular embodiment thereof, it is not to be so limited as changes and modifications may be made therein which are within the full intended scope of the invention, as defined by the appended claims.

What is claimed is:

1. In an apparatus for preparing a yarn package, in combination:
   (a) a bobbin-supply magazine;
   (b) guide means forming a closed transport path past said magazine;
   (c) a plurality of bobbin carriers on said guide means displaceable along said path successively past said magazine, each of said bobbin carriers being provided with means for removably receiving at least one bobbin adapted to be unwound to form said yarn package.
   (d) doffing means disposed along said path in the region of said magazine and engageable with said bobbin carrier for removing a depleted bobbin therefrom prior to the mounting of a full bobbin upon the carrier;
   (e) supply means disposed along said path and co-operating with said magazine forwardly of said doffing means for mounting a full bobbin upon each carrier from which a depleted bobbin has been removed at said doffing means;
   (f) knotting means disposed along said path for tying a broken strand from a nondepleted bobbin on one of said carriers to the respective yarn package, said knotting means including yarn-end recovery means co-operating with said nondepleted bobbin for retrieving said strand and drawing it toward a free end of a yarn from the respective package for tying thereto;
   (g) first, second and third actuating mechanisms spaced along said path and engageable with said carriers for operating said doffing means, said supply means and said knotting means, respectively, said carriers each being provided with a respective movable camming element having a first position wherein said element is engageable with said actuating mechanisms for inactivating said doffing and said supply means and a second position wherein all of said mechanisms are operated; and
   (h) sensing means disposed along said path and engageable with the bobbins of successive carriers to detect the presence of yarn upon said bobbins and shift the respective element from said second position to said first position in the presence of yarn upon the respective bobbin, said sensing means including restoring means for resetting said element to said second position in the absence of yarn upon the respective bobbin.

2. The combination defined in claim 1 wherein the length of said path is selected so that said bobbins are normally depleted during one complete traverse of said path, said knotting means comprising a suction pipe having a slot; circuit means operable by said carriers for developing suction in said pipe to draw a yarn end from a nondepleted bobbin and a yarn end from said package together for knotting; and means including said suction pipe for preventing kinking of the yarn during the take-up of yarn from the bobbin by the package immediately upon tying of said ends and the release thereof by said knotting means.

3. The combination defined in claim 1 wherein each of said mechanisms is operated by the carriers upon continuous displacement thereof past said mechanisms, said sensing means positioning said elements upon continuous dispalcement of the carriers therepast.

4. The combination defined in claim 3 wherein each of said mechanisms includes a respective cam follower engageable with said elements and respective operating means controlled by each cam follower for actuation of said doffing, supply and knotting means in accordance with the position of the cam element of a carrier passing said cam followers.

References Cited by the Examiner

UNITED STATES PATENTS

| | | | |
|---|---|---|---|
| 2,135,485 | 11/1938 | Abbott | 242—35.5 |
| 2,177,763 | 10/1939 | Abbott et al. | 242—35.6 |
| 2,675,971 | 4/1954 | Abbott | 242—35.6 |
| 3,030,040 | 4/1962 | Reiners | 242—35.6 |
| 3,168,257 | 2/1965 | Perry | 242—35.6 |

STANLEY N. GILREATH, *Primary Examiner.*